J. D. BELL.
Brooms.

No. 140,180.  Patented June 24, 1873.

Witnesses:

Inventor:
J. D. Bell
Per Attorneys.

UNITED STATES PATENT OFFICE.

JOHN D. BELL, OF WATTSBOROUGH, VIRGINIA.

IMPROVEMENT IN BROOMS.

Specification forming part of Letters Patent No. 140,180, dated June 24, 1873; application filed April 12, 1873.

*To all whom it may concern:*

Be it known that I, JOHN D. BELL, of Wattsborough, in the county of Lunenburg and in the State of Virginia, have invented a new and useful Improvement in Brooms; of which the following is a specification:

This invention relates to the construction of brooms, and consists in a wooden handle with a tapered end, and a tubular socket for holding broom-corn, or other material for the brush, as hereinafter described.

Figure 1:
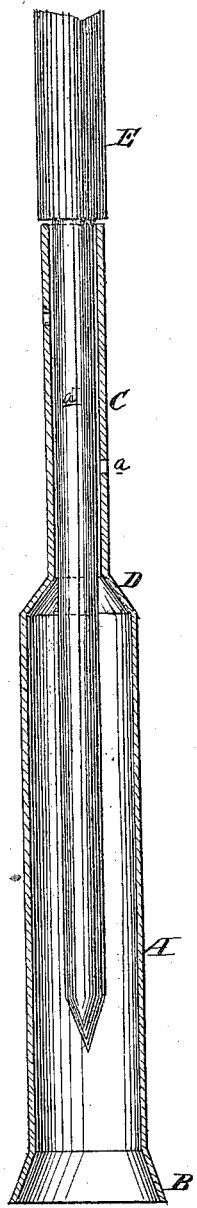
Figure 2:
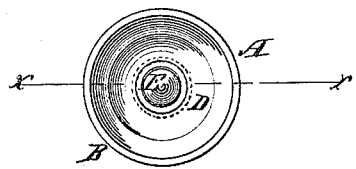

In the accompanying drawing, Figure 1 represents a longitudinal section of the tubes taken on the line $x\ x$. Fig. 2 is an end view.

Similar letters of reference indicate corresponding parts.

A is a tube with a flaring end, B. C is a tube of smaller diameter forming an extension of the tube A, and attached thereto at D by soldering or otherwise. E is the handle of the broom, which is made to fit and pass through the small part C, and extend down into the large tube as seen in the drawing.

The part of the handle which thus enters the socket A is made tapering and brought to a point.

In practice, the butts of the broom-corn are inserted and closely packed in the socket A. The tapered end of the handle is then forced down among them, thus wedging them between itself and the inner sides of the socket. When the brush needs renewal the screws which are used to secure the socket and handle together at $a$ are removed, the handle withdrawn, and the stumps of the corn extracted. The socket is then refilled as before.

What I claim is—

The tube or socket A, extension C, and handle E having a tapered and pointed end, all arranged and combined substantially as and for the purposes described.

JOHN D. BELL.

Witnesses:
I. B. BELL,
J. H. STOKES.